United States Patent
Nonobe et al.

(10) Patent No.: US 7,919,211 B2
(45) Date of Patent: *Apr. 5, 2011

(54) ON-BOARD FUEL CELL SYSTEM AND METHOD OF CONTROLLING THE SAME

(75) Inventors: Yasuhiro Nonobe, Aichi-ken (JP); Kenji Kurita, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/927,099

(22) Filed: Aug. 27, 2004

(65) Prior Publication Data

US 2005/0026010 A1 Feb. 3, 2005

Related U.S. Application Data

(62) Division of application No. 10/050,536, filed on Jan. 18, 2002, now abandoned.

(30) Foreign Application Priority Data

Jan. 18, 2001 (JP) .................... 2001-010519

(51) Int. Cl.
*H01M 8/04* (2006.01)
*H01M 8/00* (2006.01)
*H01M 8/12* (2006.01)
*H01M 2/00* (2006.01)
*H01M 2/02* (2006.01)
*H01M 2/14* (2006.01)

(52) U.S. Cl. ........ 429/444; 429/413; 429/421; 429/432; 429/515

(58) Field of Classification Search ............... 429/9, 13, 429/14, 15, 18, 19, 20, 21, 22, 23, 24, 25, 429/26, 30; 114/140; 60/783, 787; 187/223; 534/756; 358/518; 320/104

See application file for complete search history.

(56) References Cited

U.S. PATENT DOCUMENTS 3,321,334 A * 5/1967 Palmer ......................... 429/26

(Continued)

FOREIGN PATENT DOCUMENTS

DE 69302902 * 7/1996

(Continued)

OTHER PUBLICATIONS

Schmidt, Translation of an Office Action, No date, TFN010214-DE, 10201893.6-45, whole document.*

(Continued)

*Primary Examiner* — Robert Hodge
(74) *Attorney, Agent, or Firm* — Oblon, Spivak, McClelland, Maier & Neustadt, L.L.P.

(57) ABSTRACT

An on-board fuel cell system adapted to be installed on a motor vehicle includes a main passage connecting a hydrogen-gas storage device with an inlet of a fuel cell, a circulation passage that connects an outlet of the fuel cell with a first point in the main passage, a pump disposed in the circulation passage, and a bypass passage that connects a second point between the outlet of the storage device and the first point, with a third point located in the circulation passage between the outlet of the fuel cell and the pump. During a normal operation condition of the system, the hydrogen gas flows from the storage device to the fuel cell through the main passage, and hydrogen gas discharged from the fuel cell returns to the main passage through the circulation passage. When the pressure of the hydrogen gas is lower than a reference pressure, the pump operates to draw the hydrogen gas out of the storage device and feed the hydrogen gas from the main passage to the circulation passage through the bypass passage, and to the fuel cell through the main passage.

20 Claims, 5 Drawing Sheets

U.S. PATENT DOCUMENTS

| | | | |
|---|---|---|---|
| 3,455,743 A * | 7/1969 | Huebscher et al. | 429/24 |
| 3,704,172 A * | 11/1972 | Stedman et al. | 429/25 |
| 4,192,216 A | 3/1980 | Wait | |
| 4,686,157 A * | 8/1987 | Miyake et al. | 429/19 |
| 5,229,222 A | 7/1993 | Tsutsumi et al. | |
| 5,346,778 A * | 9/1994 | Ewan et al. | 429/19 |
| 5,445,099 A | 8/1995 | Rendina | |
| 6,194,092 B1 * | 2/2001 | Ohara et al. | 429/9 |
| 6,266,952 B1 | 7/2001 | Choroszylow et al. | |
| 6,296,957 B1 * | 10/2001 | Graage | 429/12 |
| 6,329,091 B1 | 12/2001 | James | |
| 6,487,904 B1 * | 12/2002 | Myhre | 73/204.12 |
| 6,635,370 B2 * | 10/2003 | Condit et al. | 429/13 |
| 2002/0076583 A1 * | 6/2002 | Reiser et al. | 429/13 |
| 2002/0094468 A1 | 7/2002 | Miura et al. | |
| 2002/0094469 A1 | 7/2002 | Yoshizumi et al. | |

FOREIGN PATENT DOCUMENTS

| | | |
|---|---|---|
| DE | 693 02 902 | 12/1996 |
| DE | 200 08 547 U1 | 9/2000 |
| DE | 698 00 711 | 11/2001 |
| JP | 59111272 A | 6/1984 |
| JP | 3-400 | 1/1991 |
| JP | 7-99707 | 4/1995 |
| JP | 7-192743 | 7/1995 |
| JP | 7-272738 | 10/1995 |
| JP | 7-282826 | 10/1995 |
| JP | 9-180743 | 7/1997 |
| JP | 9-213353 | 8/1997 |
| JP | 2002-8705 | 1/2002 |
| WO | WO 00/63993 * | 10/2000 |

OTHER PUBLICATIONS

Official Translation of WO 00/63993.*

* cited by examiner

ON-BOARD FUEL CELL SYSTEM AND METHOD OF CONTROLLING THE SAME

INCORPORATION BY REFERENCE

The disclosure of Japanese Patent Application No. 2001-010519 filed on Jan. 18, 2002, including the specification, drawings and abstract, is incorporated herein by reference in its entirety.

BACKGROUND OF THE INVENTION

1. Field of the Invention

The invention generally relates to an on-board fuel cell system suited for installation on a motor vehicle, such as an automobile, and also relates to a method of controlling such an on-board fuel cell system.

2. Description of Related Art

Fuel cells are known as generating electric power by using hydrogen gas supplied from a high-pressure hydrogen-gas tank or a hydrogen-gas absorbing alloy tank. The fuel cells, which exhibit high energy efficiency, are highly expected to be used as a power source for electric vehicles, and the like.

When such a fuel cell is used as a power source for a vehicle, there is a need to install, on the vehicle, a fuel cell system that includes not only the fuel cell, but also a hydrogen gas supply, such as a high-pressure hydrogen tank or a hydrogen-gas absorbing alloy tank, and a hydrogen-gas passage through which the hydrogen gas is fed from the hydrogen gas supply to the fuel cell.

For installation on the vehicle, therefore, the fuel cell system is preferably made as compact as possible in size and as light as possible in weight. Furthermore, the fuel cell system, which handles a highly combustible or flammable hydrogen gas, is required to assure a high degree of safety.

SUMMARY OF THE INVENTION

It is therefore one object of the invention to provide an on-board fuel cell system which is lightweight and is compact in size for installation on a vehicle, and which assures a high degree of safety.

To accomplish the above and/or other object(s), there is provided according to a first aspect of the invention an on-board fuel cell system adapted to be installed on a motor vehicle, which includes (a) a hydrogen-gas storage device including a hydrogen-gas absorbing alloy capable of absorbing or releasing a hydrogen gas, (b) a fuel cell that is supplied with the hydrogen gas discharged from the hydrogen-gas storage device, so as to generate electric power, while discharging a remaining portion of the hydrogen gas, (c) a first passage that connects an outlet of the hydrogen-gas storage device with an inlet of the fuel cell, and allows the hydrogen gas discharged from the hydrogen-gas storage device to flow therethrough to be supplied to the fuel cell, (d) a second passage that connects an outlet of the fuel cell with a first point in the first passage, and allows the hydrogen gas discharged from the fuel cell to flow therethrough to be returned to the first passage, (e) a pump that is disposed in the second passage, and is operable to force the hydrogen gas in the second passage to flow toward the first point in the first passage, (f) a third passage that connects a second point located in the first passage between an outlet of the hydrogen-gas storage device and the first point, with a third point located in the second passage between the outlet of the fuel cell and the pump, the third passage allowing the hydrogen gas diverting from the first passage to flow therethrough to be fed to the second passage, (g) a first valve that is disposed in the first passage between the second point and the first point, and is able to permit and inhibit flow of gas therethrough upon opening and closing thereof, respectively, (h) a second valve that is disposed in the second passage between the outlet of the fuel cell and the third point, and is able to permit and inhibit flow of gas therethrough upon opening and closing thereof, respectively, (i) a third valve that is disposed in the third passage, and is able to permit and inhibit flow of gas therethrough upon opening and closing thereof, respectively, and (j) a controller that controls the pump and the first, second and third valves. When a pressure of the hydrogen gas discharged from the hydrogen-gas storage device is higher than a reference pressure, the controller opens the first and second valves and closes the third valve, so that the hydrogen gas discharged from the hydrogen-gas storage device is supplied to the fuel cell through the first passage, and the hydrogen gas discharged from the fuel cell is returned to the first passage through the second passage, with the pump circulating the hydrogen gas. When the pressure of the hydrogen gas discharged from the hydrogen-gas storage device is lower than the reference pressure, on the other hand, the controller closes the first and second valves and opens the third valve, and causes the pump to draw the hydrogen gas out of the hydrogen-gas storage device and feed the hydrogen gas from the first passage to the second passage through the third passage, so that the hydrogen gas is supplied from the second passage to the fuel cell through the first passage.

According to a second aspect of the invention, there is provided a method of controlling the on-board fuel cell system constructed as described just above, which method includes the steps of (a) determining whether a pressure of the hydrogen gas discharged from the hydrogen-gas storage device is equal to or higher than a reference pressure, (b) when the pressure of the hydrogen gas is higher than the reference pressure, opening the first and second valves and closing the third valve, so that the hydrogen gas discharged from the hydrogen-gas storage device is supplied to the fuel cell through the first passage, and the hydrogen gas discharged from the fuel cell is returned to the first passage through the second passage, with the pump circulating the hydrogen gas, and (c) when the pressure of the hydrogen gas is lower than the reference pressure, closing the first and second valves while opening the third valve, and causing the pump to draw the hydrogen gas out of the hydrogen-gas storage device and feed the hydrogen gas from the first passage to the second passage through the third passage, so that the hydrogen gas is supplied from the second passage to the fuel cell through the first passage.

In the on-board fuel cell system or control method thereof as described above, a single pump is used for circulating the hydrogen gas during a normal operating condition of the fuel cell system in which the pressure of the hydrogen gas is higher than the reference pressure level, and is also used for drawing the hydrogen gas when the pressure of the hydrogen gas is lower than the reference level, for example, upon a start of the fuel cell system at a low temperature. Thus, the same pump is used for the two purposes, i.e., for circulating the hydrogen gas and drawing the gas from the storage device, resulting in reduced space required for installing the fuel cell system on the vehicle, and a reduction in the weight of the system, as compared with the case where separate pumps or other devices are provided for the above two purposes.

By circulating the hydrogen gas with the pump during a normal operating condition of the fuel cell system, an apparent flow rate (i.e., amount and flow speed) of the hydrogen gas supplied to the fuel cell is increased, which is advantageous in terms of supply of hydrogen to the fuel cell, and leads to an increased output voltage of the fuel cell. Furthermore, even if impurities, such as nitrogen, leak into the hydrogen gas in the fuel cell, the impurities are uniformly distributed over the entire length of a hydrogen-gas flow system including the first and second passages, with the hydrogen gas circulating in the flow system. Thus, the impurities are prevented from remaining in the fuel cell and causing a problem with the power generating operation of the fuel cell.

Although the hydrogen gas is less likely to be released from the hydrogen-gas absorbing alloy in the hydrogen-gas storage device upon a low-temperature start of the fuel cell system, the pump is able to draw the hydrogen gas out of the storage device, so that the fuel cell can start operating in a steady state within a relatively short time.

For example, the first and second valves as indicated above may be integrated into a flow-path switching valve.

According to a third aspect of the invention, there is provided an on-board fuel cell system adapted to be installed on a motor vehicle, which system includes: (a) a hydrogen-gas supply device that supplies a hydrogen gas; (b) a fuel cell that is supplied with the hydrogen gas discharged from the hydrogen-gas supply device, so as to generate electric power, while discharging a remaining portion of the hydrogen gas, the fuel cell having a plurality of channels through which the hydrogen gas flows; (c) a first passage that connects an outlet of the hydrogen-gas supply device with an inlet of the fuel cell, and allows the hydrogen gas discharged from the hydrogen-gas supply device to flow therethrough to be supplied to the fuel cell; (d) a second passage that connects an outlet of the fuel cell with a particular point in the first passage, and allows the hydrogen gas discharged from the fuel cell to flow therethrough to be returned to the first passage; (e) a pump that is disposed in the second passage, and is operable to force the hydrogen gas in the second passage to flow toward the particular point in the first passage; and (f) a controller that controls the hydrogen-gas supply device and the pump. Upon a start of the fuel cell system, the controller causes the hydrogen-gas supply device to deliver the hydrogen gas, while driving the pump so as to induce flow of the hydrogen gas through at least a portion of the first and second passages and the channels of the fuel cell, thereby to mix impurities existing in the channels with the hydrogen gas delivered from the hydrogen-gas supply device to provide a homogeneous mixture thereof.

According to a fourth aspect of the invention, there is provided a method of controlling the on-board fuel cell system constructed as described just above, which method includes the steps of: (a) causing the hydrogen-gas supply device to deliver the hydrogen gas upon a start of the fuel cell system; and (b) driving the pump so as to induce flow of the hydrogen gas through at least a portion of the first and second passages and the channels of the fuel cell, thereby to mix impurities existing in the channels with the hydrogen gas delivered from the hydrogen-gas supply device to provide a homogeneous mixture thereof.

Upon a start of the fuel cell system, impurities, such as nitrogen, may be contained in hydrogen-gas channels within the fuel cell. By merely permitting hydrogen gas to flow through the hydrogen-gas channels, it takes a long time by the time at which the output voltage of the fuel cell reaches a desired voltage level. In the on-board fuel cell system or the control method as described above, therefore, the hydrogen gas is delivered from the hydrogen-gas supply device upon a start of the fuel cell system, and at the same time the pump is driven so as to induce or create strengthened flow of the hydrogen gas through the appropriate hydrogen-gas channels, thereby to mix impurities existing in the channels with the hydrogen gas delivered from the hydrogen-gas supply device to provide a homogeneous mixture thereof.

With the remaining impurities, such as nitrogen, being uniformly mixed with the hydrogen gas delivered from the hydrogen-gas supply device as described above, the output voltage of the fuel cell is immediately raised to the desired level, and desired power can be supplied to the load connected to the fuel cell.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Some exemplary preferred embodiments of the invention will be described in detail with reference to the accompanying drawings.

First Embodiment

Figure 1:
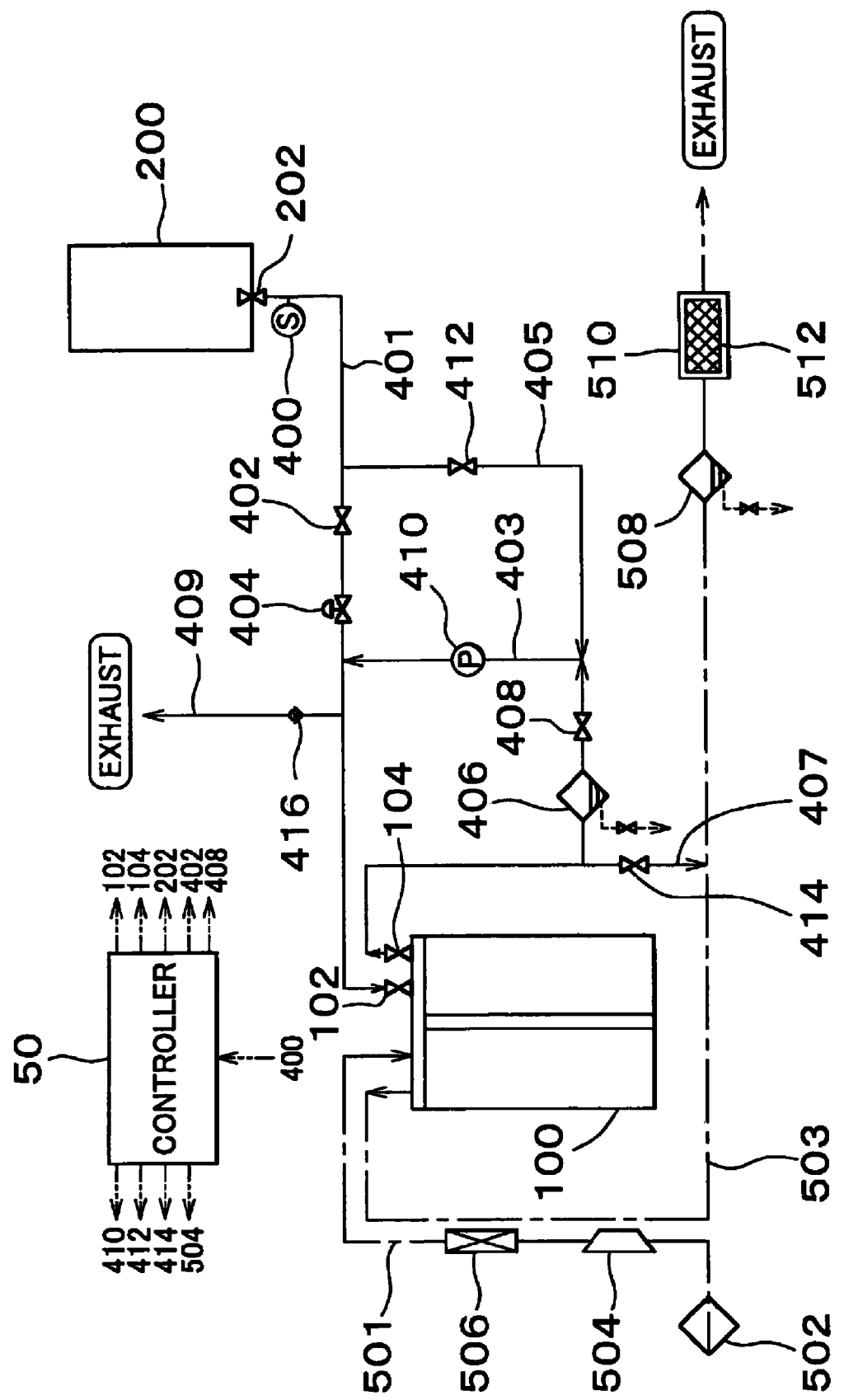
FIG. 1 is a schematic diagram showing the construction of an on-board fuel cell system according to a first preferred embodiment of the invention.

FIG. 1 schematically shows the construction of an on-board fuel cell system according to a first embodiment of the invention. The fuel cell system of this embodiment is installed on a motor vehicle, such as an automobile. The fuel cell system primarily includes a fuel cell 100 that generates electric power by using hydrogen gas supplied thereto, and a hydrogen-gas absorbing alloy tank 200 from which hydrogen gas is supplied to the fuel cell 100.

The fuel cell 100 is supplied with oxidizing gas (e.g., air) including oxygen as well as the hydrogen gas including hydrogen. The hydrogen gas and the oxidizing gas thus supplied undergo electrochemical reactions as represented by formulas (1) and (2) below at a hydrogen electrode and an oxygen electrode, respectively, so that the fuel cell 100 generates electric power.

More specifically, a reaction as expressed by the following formula (1) occurs on the side of the hydrogen electrode when the hydrogen gas is supplied to the hydrogen electrode, and a reaction as expressed by the following formula (2) occurs on the side of the oxygen electrode when the oxidizing gas is supplied to the oxygen electrode. Thus, the fuel cell 100 as a whole performs an electrochemical reaction as expressed by the following formula (3).

$$H_2 \rightarrow 2H^+ + 2e^- \tag{1}$$

$$2H^+ + 2e^- + (1/2)O_2 \rightarrow H_2O \tag{2}$$

$$H_2 + (1/2)O_2 \rightarrow H_2O \tag{3}$$

In the vehicle incorporating the fuel cell system 100 as a power source, an electric motor (not shown) is driven by the electric power generated by the fuel cell system 100. The resulting torque of the electric motor is then transmitted to an axle (not shown), thus producing driving force of the vehicle.

The fuel cell 100 has a stacked structure formed by stacking or laminating a plurality of unit cells together. Each of the unit cells includes an electrolyte layer (not shown), a pair of diffusion electrodes (not shown) in the form of the hydrogen electrode and the oxygen electrode, and two separators. The hydrogen and oxygen electrodes are superposed on opposite major surfaces of the electrolyte layer, and the separators are superposed on the outer surfaces of the hydrogen and oxygen electrodes. Grooves or recesses are formed in the opposite surfaces of each of the separators, such that unit-cell gas channels are formed between the separators and the hydrogen electrode and oxygen electrode interposed therebetween. In operation, the hydrogen gas supplied to the fuel cell 100 flows through the unit-cell gas channels formed between the separators and the hydrogen electrodes, and the oxidizing gas supplied to the fuel cell 100 flows through the unit-cell gas channels formed between the separators and the oxygen electrodes.

In the meantime, the hydrogen-gas absorbing alloy tank 200 stores a hydrogen-gas absorbing alloy (not shown) therein. In general, the hydrogen-gas absorbing alloy undergoes an endothermic reaction when heated, thereby to release hydrogen, and undergoes an exothermic reaction when cooled, thereby to absorb hydrogen. In order to take hydrogen out of the hydrogen-gas absorbing alloy, therefore, the hydrogen-gas absorbing alloy contained in the hydrogen-gas absorbing alloy tank 200 is heated by a suitable heat exchanger (not shown).

The hydrogen-gas absorbing alloy may deteriorate if it reacts with impurities. Therefore, high-purity hydrogen is stored in the hydrogen-gas absorbing alloy tank 200.

The fuel cell system according to the first embodiment of the invention further includes a hydrogen-gas flow system for permitting flow of the hydrogen gas through the system, an oxidizing-gas flow system for permitting flow of the oxidizing gas through the system, and a controller 50.

The hydrogen-gas flow system includes a main-stream passage 401 that extends from an outlet of the hydrogen-gas absorbing alloy tank 200 to an inlet of the fuel cell 100, a circulation passage 403 through which hydrogen gas flows from an outlet of the fuel cell 100 back to the main-stream passage 401 through a pump 410 which will be described later, and a bypass passage 405 that diverges from the main-stream passage 401 and is connected to the circulation passage 403. The hydrogen-gas flow system further includes a drain passage 407 for discharging impurities contained in the hydrogen gas circulating through the hydrogen-gas flow system, and a relief passage 409 for discharging a certain amount of hydrogen gas when the pressure of the hydrogen gas in the flow system becomes excessively high.

In the main-stream passage 401, a shut-off valve 202 is disposed at the outlet of the hydrogen-gas absorbing alloy tank 200, and a pressure sensor 400, a shut-off valve 402, and a pressure reducing valve 404 are disposed at selected positions in the passage 401. In the circulation passage 403, a shut-off valve 104 is disposed at the inlet of the fuel cell 100, and a gas-liquid separator 406, a shut-off valve 408, and the pump 410 are disposed at selected positions in the passage 403. Furthermore, a shut-off valve 412 is disposed in the bypass passage 405, and a shut-off valve 414 is disposed in the drain passage 407, while a relief valve 416 is disposed in the relief passage 409.

On the other hand, the oxidizing-gas flow system includes an oxidizing-gas supply passage 501 through which oxidizing gas is supplied to the fuel cell 100 and an oxygen-off-gas drain passage 503 through which oxygen off-gas is discharged from the fuel cell 100.

In the oxidizing-gas flow system, an air cleaner 502, a compressor 504, and a humidifier 506 are disposed at selected positions in the oxidizing-gas supply passage 501. Also, a gas-liquid separator 508 and a combustor 510 are disposed at selected positions in the oxygen-off-gas drain passage 503.

The controller 50 receives a signal from the pressure sensor 400 for detecting the pressure in the main-stream passage 401, and controls operation of each of the valves 102, 104, 202, 402, 408, 412, 414, the pump 410 and the compressor 504. In FIG. 1, control lines that indicate connection between the controller 50 and each of the above components are not shown for the sake of simplicity.

First, flow of the oxidizing gas in the oxidizing-gas flow system will be briefly described. The compressor 504 is driven by the controller 50 so as to introduce a suitable amount of air in the atmosphere into the oxidizing-gas supply passage 501, for use as oxidizing gas in the fuel cell 100. The air thus introduced is purified by the air cleaner 502, is passed through the humidifier 506, and is then supplied to the fuel cell 100 through the oxidizing-gas supply passage 501. The oxidizing gas supplied to the fuel cell 100 is used for the above-described electrochemical reaction, and is then discharged form the fuel cell 100 as the oxygen off-gas. The oxygen off-gas discharged from the fuel cell 100 flows through the oxygen-off-gas drain passage 503, while passing through the gas-liquid separator 508 (which will be described in detail later) and the combustor 510. Then, the oxygen off-gas is finally discharged or released to the atmosphere.

Next, flow of the hydrogen gas in the hydrogen-gas flow system will be described in detail. The controller 50 controls operation of the shut-off valve 202 disposed in the hydrogen-gas absorbing alloy tank 200, and the shut-off valves 102, 104 disposed in the fuel cell 100, such that the valves 202, 102, 104 are normally open during operations of the fuel cell system, and are closed when the fuel cell system stops being operated.

When the fuel cell system is in a normal operating condition, the controller 50 controls the shut-off valves such that the shut-off valve 402 of the main-stream passage 401 and the shut-off valve 408 of the circulation passage 403 as well as the shut-off valves 202, 102, 104 as described above are opened, while the shut-off valve 412 of the bypass passage 405 and the shut-off valve 414 of the drain passage 407 are closed. The relief valve 416 is normally closed under the control of the controller 50 except when a pressure of the hydrogen gas in the passage 401 become excessively high, as will be described later. The pressure sensor 400 detects the pressure of the hydrogen gas discharged from the hydrogen-gas-absorbing alloy tank 200.

In the normal operating condition of the fuel cell system, the hydrogen-gas absorbing alloy contained in the hydrogen-gas absorbing alloy tank 200 is heated by a suitable heat exchange system so as to discharge hydrogen gas. The discharged hydrogen gas is then supplied to the fuel cell 100 through the main-stream passage 401. The hydrogen gas fed to the fuel cell 100 is consumed through the electrochemical reaction in the fuel cell 100, and is then discharged from the fuel cell 100 as a hydrogen off-gas. The discharged hydrogen off-gas is returned to the main-stream passage 401 through the circulation passage 403, so that the off-gas is supplied to the fuel cell 100 again to be reused. At this time, the pump 410 disposed in the circulation passage 403 is driven to force or urge the hydrogen off-gas passing through the circulation passage 403 to be fed to the main-stream passage 401. In this manner, the hydrogen gas circulates through the main-stream passage 401 and the circulation passage 403 when the fuel cell system is in the normal operating condition.

Since the hydrogen off-gas is returned to the main-stream passage 401 for circulation, apparent amount and flow speed of the hydrogen gas supplied to the fuel cell 100 are increased, even though the same amount of hydrogen is used or consumed in the fuel cell 100. This arrangement is advantageous in terms of supply of hydrogen to the fuel cell 100, and leads to an increase of an output voltage of the fuel cell 100.

In the fuel cell 100, impurities, such as nitrogen, contained in the oxidizing gas may leak from the oxygen electrode side to the hydrogen electrode side through the electrolyte layer. Accordingly, if the hydrogen gas is not circulated in the fuel cell system, the impurities may be accumulated on the hydrogen electrodes in a downstream portion of the fuel cell 100. The range of accumulation of the impurities on the hydrogen electrodes expands with time, which may cause a problem with the power generating operation of the fuel cell 100, resulting in a reduction in the output voltage of the fuel cell 100. In this embodiment in which the hydrogen gas is circulated as described above, on the other hand, the impurities may be uniformly distributed over the entire length of the hydrogen-gas passage, and the fuel cell system is free from the above-described problem caused by accumulation of the impurities.

The controller 50 controls operation of the pump 410 so that the flow rate or speed of the hydrogen gas through the circulation passage 403 varies depending upon an amount of consumption of the electric power generated by the fuel cell 100.

The hydrogen gas discharged from the hydrogen-gas absorbing alloy tank 200 has a considerably high pressure that is not larger than 1 MPa. If the discharged hydrogen gas is directly fed to the fuel cell 100, the fuel cell 100 may deteriorate due to the high pressure of the hydrogen gas. In view of this problem, the pressure reducing valve 404 disposed in the main-stream passage 401 is actuated to reduce the pressure of the hydrogen gas from 1 MPa to an appropriate level to be fed to the fuel cell 100, i.e., to a level ranging from about 0.2 MPa to about 0.3 MPa. Thus, the hydrogen gas whose pressure has been appropriately reduced is fed to the fuel cell 100.

In the fuel cell 100, water ($H_2O$) is produced on the oxygen electrode side according to the reaction as expressed by the above-indicated formula (2). The water in the form of vapor passes through the electrolyte layer, from the oxygen electrode side to the hydrogen electrode side. For this reason, the hydrogen off-gas discharged from the fuel cell 100 is wet and contains a significantly large amount of moisture. If the hydrogen off-gas is directly returned to the main-stream passage 401 via the pump 410, the moisture or water contained in the hydrogen off-gas is not vaporized sufficiently. As a result, the mixture of the hydrogen gas and the moisture, i.e., a gas-liquid mixture is fed to the fuel cell 100. The moisture supplied to the fuel cell 100 may adhere to walls in the unit cells of the fuel cell stack, possibly resulting in clogging of hydrogen-gas channels in the fuel cell 100. If the hydrogen-gas channels are clogged or closed due to the moisture contained in the hydrogen gas, and flow of the hydrogen gas through the channels is restricted or stopped, the output voltage of the unit cells of the fuel cell 100 is reduced, resulting in a reduction in electric power generated by the fuel cell 100 as a whole.

In view of the above-described problem, the gas-liquid separator 406 disposed in the circulation passage 403 functions to separate the moisture contained the hydrogen off-gas into a liquid component and a gas component (i.e., water vapor). The separator 406 then removes the liquid component of the hydrogen off-gas, and feeds only the gas component (i.e., water vapor) to the pump 410 along with other gases. With the gas-liquid separator 406 thus provided, only the gas component of the moisture contained in the hydrogen gas, rather than the gas-liquid mixture, is supplied to the fuel cell 100. Thus, the provision of the separator 406 eliminates the possibility of deterioration of the power generating operation of the fuel cell 100 due to the moisture supplied to the fuel cell 100.

Figure 2:
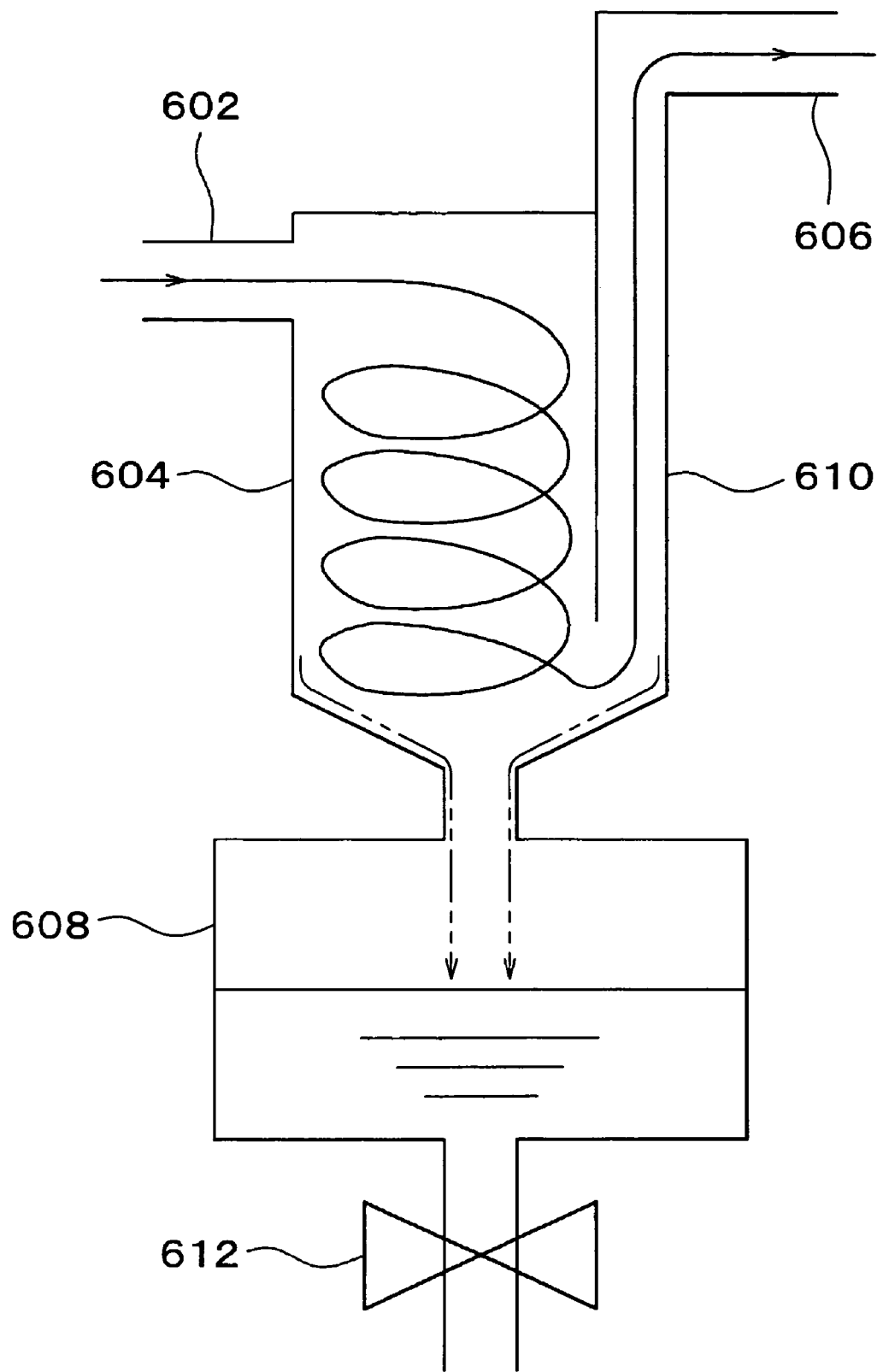
FIG. 2 is a cross-sectional view of one example of a gas-liquid separator for use in the fuel cell system of FIG. 1.

FIG. 2 shows, in cross section, one example of a gas-liquid separator that may be used in the fuel cell system of FIG. 1. A hydrogen off-gas containing a large amount of moisture is introduced into a cylinder 604 through an inlet 602 of the gas-liquid separator. The hydrogen off-gas introduced from the inlet 602 falls or descends along an inner wall of the cylinder 604 while rotating spirally. In this process, the moisture contained in the hydrogen off-gas is concentrated. Namely, the liquid component of the moisture in the form of droplets adheres to the inner wall of the cylinder 604, and the droplets fall along the inner wall of the cylinder 604, to be collected in a liquid storage 608. On the other hand, the gas component of the moisture (i.e., water vapor) is discharged from an outlet 606 through a gas passage 610 together with other gas components in the hydrogen off-gas. In this manner, the moisture contained in the hydrogen off-gas can be separated into the liquid component and the gas component as described above.

The amount or level of water collected in the liquid storage 608 may be detected by a level sensor (not shown) or the like. When the level sensor detects a predetermined amount of water collected in the liquid storage 608, a drain mechanism (not shown) is actuated to automatically open a cock 612, to thereby discharge the collected water through the cock 612.

As discussed above, the hydrogen gas is circulated in the hydrogen-gas flow system so that the impurities contained in the hydrogen gas are uniformly distributed over the entire length of the circulation path. Even with the hydrogen gas thus homogenized, the fuel cell 100 experiences constant leakage of the impurities from the oxygen electrode side to the hydrogen electrode side through the electrolyte layer, and therefore the concentration of the impurities in the hydrogen gas gradually increases over a long period of use. As a result, the concentration of hydrogen in the hydrogen gas gradually decreases with time, which may give rise to an adverse effect on the power generating operation of the fuel cell 100.

In view of the above problem, the shut-off valve 414 is provided in the drain passage 407 that diverges from the circulation passage 403. The shut-off valve 414 is periodically opened to discharge the circulating hydrogen gas containing the impurities. The discharged hydrogen gas containing the impurities is replaced with pure hydrogen gas newly supplied from the hydrogen-gas absorbing alloy tank 200. This arrangement makes it possible to lower the concentration of the impurities in the circulating hydrogen gas, while increasing the concentration of hydrogen in the hydrogen gas, whereby the fuel cell 100 become able to appropriately perform its power generating operation.

As described above, the fuel cell 100 also experiences leakage of water vapor from the oxygen electrode side to the hydrogen electrode side through the electrolyte layer. The water vapor may be concentrated and adheres to the walls of the unit cells, depending upon an operation temperature of the fuel cell 100, and the resulting moisture or water may restrict or stop flow of the hydrogen gas through the unit cells. If the shut-off valve 414 is opened to discharge the hydrogen gas in this situation, rapid flow of the hydrogen gas takes place due to a difference between the pressure in the hydrogen-gas flow system and the atmospheric pressure, and the moisture adhering to the unit cells can be blown off, utilizing the stream of the hydrogen gas.

The opening of the shut-off valve 414 during the power generating operation of the fuel cell 100 causes a temporary or instantaneous drop of the output voltage of the fuel cell 100, but does not result in a significant reduction in the output voltage. The shut-off valve 414 is preferably kept opened for 1 sec. or shorter, more preferably for about 500 m sec.

The hydrogen gas discharged from the shut-off valve 414 is fed to the oxygen off-gas drain passage 503 via the drain passage 407, and is then mixed with the oxygen-off gas flowing through the oxygen off-gas drain passage 503. The mixture of the discharged hydrogen gas and the oxygen off-gas is fed to the combustor 510 through the gas-liquid separator 508. The combustor 510 houses a platinum catalyst 512. In the combustor 510, hydrogen and oxygen contained in the mixed gas are caused to react with each other by combustion, so that the content of the hydrogen in the mixed gas is further reduced. The mixed gas emitted from the combustor 510 is then discharged or released to the atmosphere.

While the flow of the hydrogen gas during the normal operating condition of the fuel cell system has been described above, there will be described flow of the hydrogen gas during a low-temperature startup condition of the fuel cell system.

In general, a pressure at which the hydrogen-gas absorbing alloy discharges hydrogen increases as the temperature of the hydrogen-gas absorbing alloy increases, and decreases as the temperature of the hydrogen-gas absorbing alloy decreases. Thus, the hydrogen-gas absorbing alloy tank 200 is less likely to discharge hydrogen as the temperature thereof decreases. It is therefore necessary to rapidly heat the hydrogen-gas absorbing alloy tank 200 by a heater or the like during the low-temperature startup condition of the fuel cell 100, in order to facilitate discharging of hydrogen from the hydrogen-gas absorbing alloy tank. However, the use of the heater for heating the hydrogen-gas absorbing alloy tank requires a great amount of electric energy, and is thus undesirable or inappropriate if the fuel cell system is to be installed on a motor vehicle.

In view of the above, the fuel cell system of this embodiment utilizes the pump 410 to forcedly draw hydrogen out of the hydrogen-gas absorbing alloy tank 200, instead of heating the hydrogen-gas absorbing alloy tank by the heater.

Figure 3:
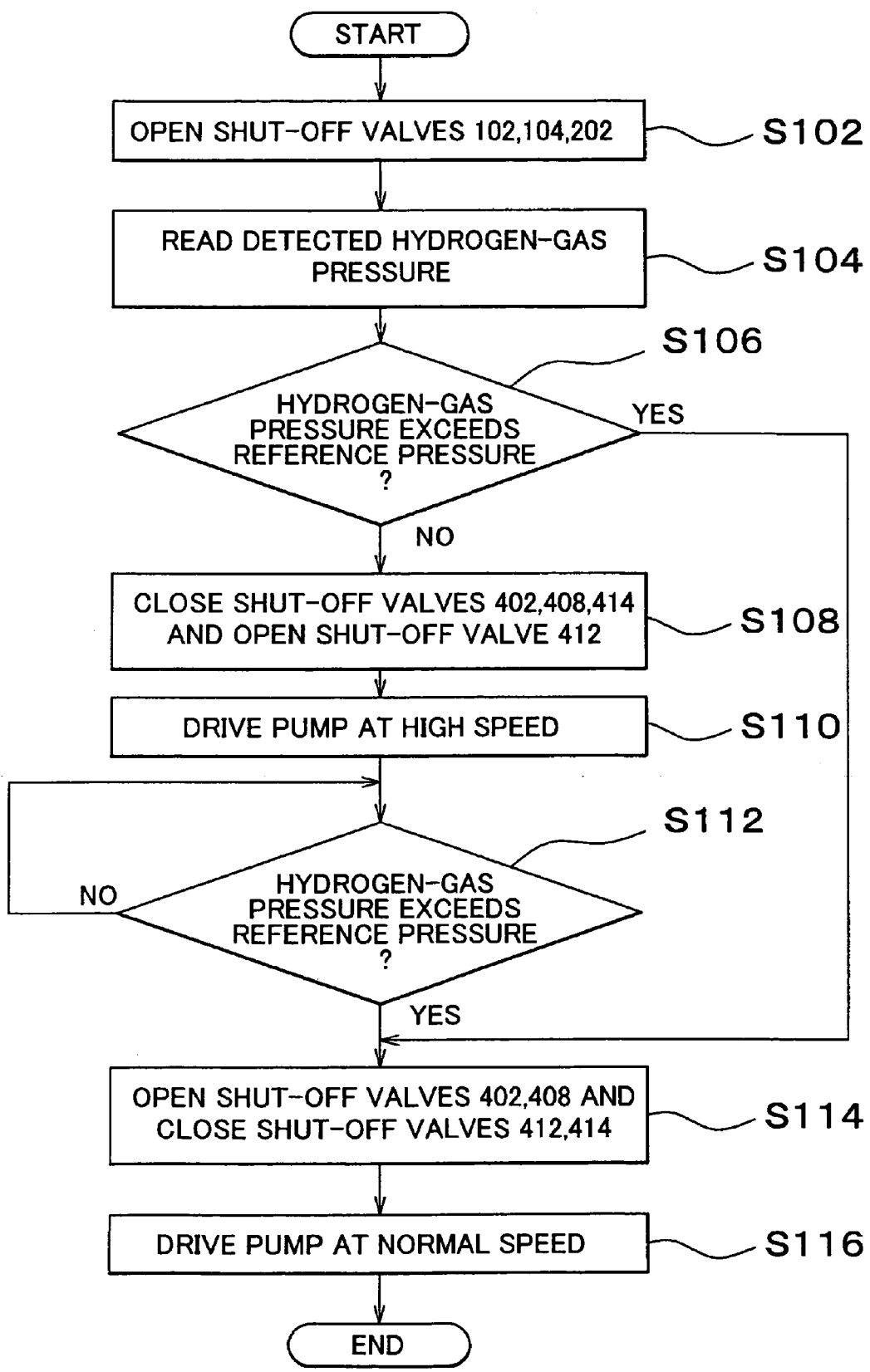
FIG. 3 is a flowchart illustrating an example of a control routine executed by a controller when the fuel cell system of FIG. 1 is started.

FIG. 3 shows a flowchart illustrating an example of a control routine executed by the controller 50 when the fuel cell system of FIG. 1 is started.

Upon the start of the fuel cell system, the controller 50 executes step S102 as shown in FIG. 3 to open the shut-off valve 202 of the hydrogen-gas absorbing alloy tank 200, and the shut-off valves 102 and 104 of the fuel cell 100. Next, the controller 50 executes step S104 to read the pressure level of the hydrogen gas detected by the pressure sensor 400. Then, the controller 50 executes step S106 to determine whether the detected pressure level of the hydrogen gas exceeds a predetermined reference pressure.

If the ambient temperature is sufficiently high, and the hydrogen-gas absorbing alloy tank 200 discharges hydrogen at a sufficiently high pressure that is higher than the predetermined reference pressure, the controller 50 proceeds to step S114 to place the fuel cell system in the normal operating condition as described above. In step S114, the shut-off valve 402 disposed in the main-stream passage 401 and the shut-off valve 408 disposed in the circulation passage 403 are opened, while the shut-off valve 412 disposed in the bypass passage 405 and the shut-off valve 414 disposed in the drain passage 407 are closed. The controller 50 then proceeds to step S116 to drive the pump 410 at a normal speed, to thereby realize circulation of the hydrogen gas as described above.

If the ambient temperature is comparatively low, on the other hand, the hydrogen-gas absorbing alloy tank 200 is less likely to discharge hydrogen and the pressure of the discharged hydrogen is lower than the predetermined reference pressure. In this case, the controller 50 proceeds to step S108 to place the fuel cell system in the low-temperature startup operating condition. In step S108, the shut-off valve 402 disposed in the main-stream passage 401, the shut-off valve 408 disposed in the circulation passage 403, and the shut-off valve 414 disposed in the drain passage 407 are closed, while the shut-off valve 412 disposed in the bypass passage 405 is opened. The controller 50 then proceeds to step S110 to drive the pump 410 at a high speed, so that a sufficient amount of hydrogen gas absorbed in the hydrogen-gas absorbing alloy can be drawn out of the hydrogen-gas absorbing alloy tank 200, even in the case where the temperature of the hydrogen-gas absorbing alloy tank 200 is relatively low and the hydrogen gas is discharged at a relatively low pressure. The hydrogen gas drawn from the hydrogen-gas absorbing alloy tank 200 is initially introduced to the main-stream passage 401, and then flows through the bypass passage 405 and circulation passage 403 in this order. The hydrogen gas is then returned to the main-stream passage 401, and is then supplied to the fuel cell 100. The hydrogen gas supplied to the fuel cell 100 is subjected to the electrochemical reaction in the fuel cell 100. The resulting hydrogen off-gas is then discharged to the circulation passage 403. Since the concentration of the impurities in the hydrogen off-gas increases with time, the shut-off valve 414 is periodically opened to discharge the hydrogen off-gas through the drain passage 407.

The controller 50 keeps the fuel cell system in the above-described low-temperature startup operating condition until it is determined in step S112 that the pressure of the hydrogen gas discharged from the hydrogen-gas absorbing alloy tank 200 exceeds the predetermined reference pressure. After a whole following the start of the fuel cell system, the heat exchanger (not shown) comes to operate satisfactorily, so as to heat the hydrogen-gas absorbing alloy housed in the hydrogen-gas absorbing alloy tank 200. As a result, the temperature of the hydrogen-gas absorbing alloy is increased, and the hydrogen-gas absorbing alloy tank 200 becomes able to discharge hydrogen gas at a sufficiently high temperature. Consequently, the pressure of the hydrogen gas exceeds the reference pressure level, and the controller 50 proceeds to step S114 to shift the fuel cell system to the normal operating condition. In step S114, the shut-off valve 402 disposed in the main-stream passage 401 and the shut-off valve 408 disposed in the circulatory passage 403 are opened, and the shut-off valve 412 disposed in the by-pass passage 405 and the shut-off valve 414 disposed in the drain passage 407 are closed. Then, the controller 50 proceeds to step S116 to drive the pump 410 at the normal speed.

In the low-temperature startup operating condition, the fuel cell system utilizes the pump 410 for drawing hydrogen stored in the hydrogen-gas absorbing alloy tank 200, without requiring a great amount of electric energy.

In the fuel cell system of the present embodiment, the same pump 410 is used for circulating the hydrogen gas during the normal operating condition and for drawing the hydrogen gas from the hydrogen-gas absorbing alloy tank 200 during the low-temperature startup operating condition. Thus, the common use of the pump 410 leads to reduced space for installation and reduced weight of the system.

In the present embodiment, the pump 410 is able to change its speed of rotation so as to change its flow rate of the hydrogen gas, depending upon whether the pump 410 operates to circulate the hydrogen gas, or operates to draw the hydrogen gas from the hydrogen-gas absorbing alloy tank 200. Namely, the pump 410 requires relatively small power for circulating the hydrogen gas in the hydrogen-gas flow system, since the compression ratio of the pump 410 (i.e., the ratio of a discharge pressure to an intake pressure of the pump 410) is relatively low. On the other hand, the pump 410 requires relatively large power for drawing the hydrogen gas form the hydrogen-gas absorbing alloy tank 200, since the compression ratio of the pump 410 is relatively high.

While the flow of the hydrogen gas during the low-temperature startup operating condition of the fuel cell system has been described above, there will be described a condition of the fuel cell system when it is stopped.

In the fuel cell 100, the impurities, such as water vapor and nitrogen, leak from the oxygen electrode side to the hydrogen electrode side through the electrolyte layer, as described above. Accordingly, the hydrogen gas circulated during the normal operating condition contains a certain amount of these impurities. If the operation of the fuel cell system is subsequently stopped, the hydrogen-gas absorbing alloy tank 200 is accordingly stopped, and the temperature within the tank 200 is lowered. In this condition, a pressure within the hydrogen-gas absorbing alloy tank 200 may also decrease to a negative level, depending upon the temperature of the tank 200. In this case, hydrogen gas flows in a reverse direction from the main-stream passage 401 or the bypass passage 405 to the outlet of the hydrogen-gas absorbing alloy tank 200. If normal shut-off valves are used as the shut-off valve 402 disposed in the main-stream passage 401 and the shut-off valve 412 disposed in the by-pass passage 405, such reverse flow of the hydrogen gas toward the outlet of the hydrogen-gas absorbing alloy tank 200 cannot be completely prevented. As a result, hydrogen gas remaining in portions of the hydrogen-gas flow system that are closer to the fuel cell 100 than the shut-off valves 402, 412 leaks into a portion of the hydrogen-gas flow system closer to the hydrogen-gas absorbing alloy tank 200, through the shut-off valves 402, 412, and the leaking hydrogen gas then flows into the hydrogen-gas absorbing alloy tank 200. Since the hydrogen gas flowing into the tank 200 contains impurities, such as nitrogen and water vapor, the impurities are also introduced into the hydrogen-gas absorbing alloy tank 200. In this case, the impurities may possibly affect the hydrogen-gas absorbing alloy housed in the hydrogen-gas absorbing alloy tank 200.

In view of the above-described problem, the shut-off valves 402, 412 used in this embodiment are provided with a function of preventing or inhibiting reverse flow of the hydrogen gas. By using the shut-off valves with the reverse-flow preventing function, the hydrogen gas containing the impurities is prevented or inhibited from leaking into the hydrogen-gas passage on the side of the hydrogen-gas absorbing alloy tank 200 through the shut-off valves 402, 412, even when reverse flow of the hydrogen gas toward the tank 200 takes place upon a stop of the operation of the fuel cell system. It is thus possible to protect the hydrogen-gas absorbing alloy in the hydrogen-gas absorbing alloy tank 200.

While the condition of the fuel cell system upon a stop of the operation of the system has been described above, the operation of the fuel cell system when it is in an abnormal state will be hereinafter described.

If any abnormality, such as a failure in the pressure reducing valve 404, arises in the fuel cell system, the pressure of the hydrogen gas supplied to the fuel cell 100 increases to an excessively high level, which may cause a problem to the fuel cell 100. In view of this problem, the present embodiment is provided with the relief valve 416 disposed in the relief passage 409 that diverges from the main-stream passage 401. The relief valve 416 is opened to discharge a certain amount of hydrogen gas to the atmosphere outside the vehicle, when the pressure of the hydrogen gas as measured in a portion of the main-stream passage 401 located between the pressure reducing valve 404 and the fuel cell 100 is raised to be equal to or higher than a predetermined level. Preferably, an outlet of the relief valve 416 is provided at a position that permits the hydrogen gas to be discharged toward a road surface, so that the hydrogen gas thus discharged will not stay at a certain location. With the relief valve 416 thus located, the hydrogen discharged is likely to be diffused in the atmosphere.

Upon occurrence of a collision of the vehicle with another vehicle or object, or a malfunction of a control system, the fuel cell system may suffer from leakage of the hydrogen gas in the very worst case. In the fuel cell system of this embodiment, if vibrations caused by, for example, the collision of the vehicle or the malfunction of the control system are detected, the controller 50 operates to automatically close the shut-off valve 202 disposed in the hydrogen-gas absorbing alloy tank 200 and the shut-off valves 102, 104 disposed in the fuel cell 100. In this condition, the supply of the hydrogen gas is stopped, thus preventing the leakage of the hydrogen gas from the fuel cell system.

Second Embodiment

Figure 4:
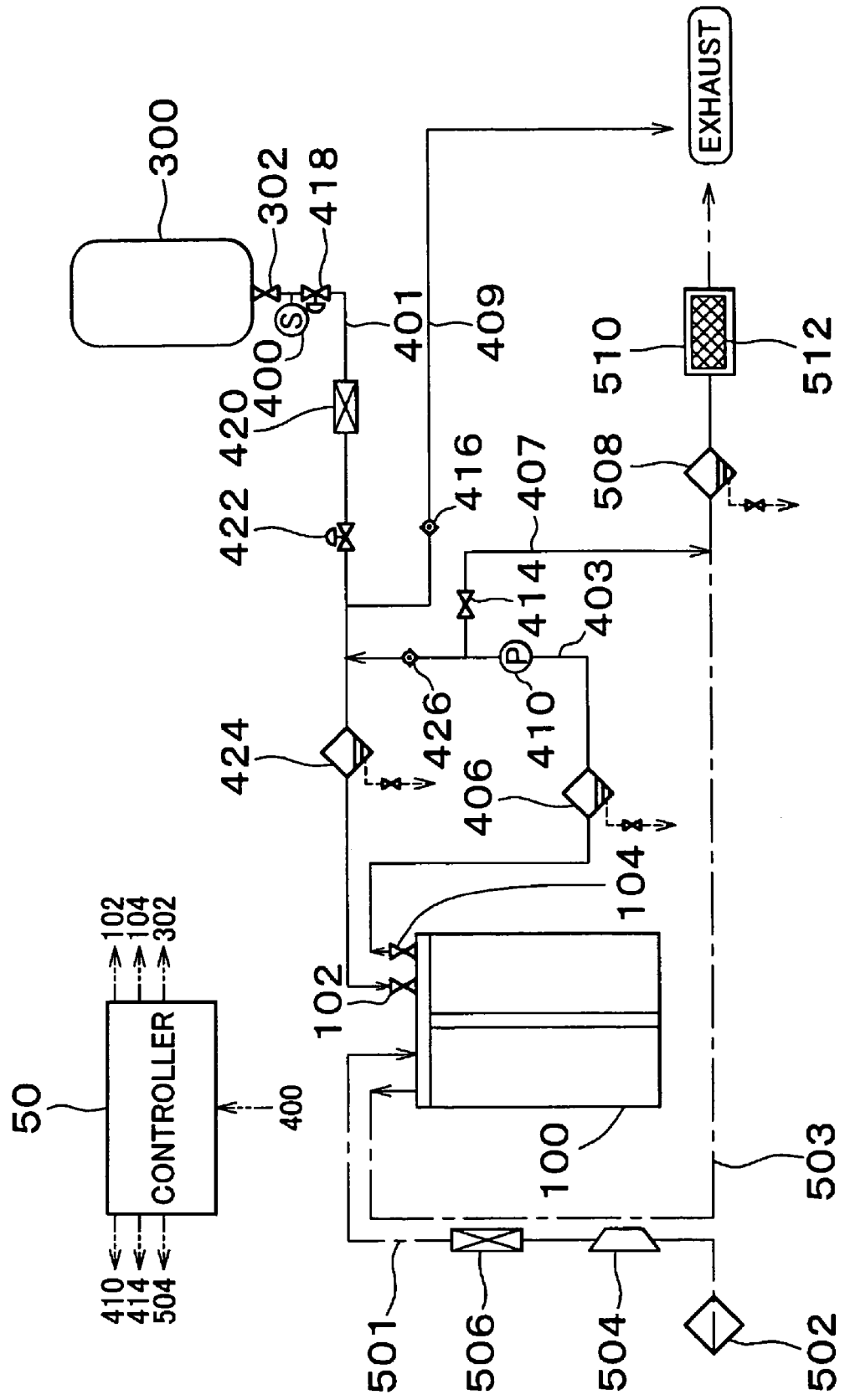
FIG. 4 is a schematic diagram showing the construction of an on-board fuel cell system according to a second preferred embodiment of the invention.

FIG. 4 schematically shows the construction of an on-board fuel cell system according to a second embodiment of the invention. While the hydrogen-gas absorbing alloy tank 200 is used as a hydrogen-gas supply in the fuel cell system of the first embodiment, a high-pressure hydrogen-gas tank 300 is used as a hydrogen-gas supply in the fuel cell system of the second embodiment.

The high-pressure hydrogen-gas tank 300 is filled with a high-pressure hydrogen gas, and a shut-off valve 302 is attached to the bottom of the tank 300. The shut-off valve 302 is opened so as to discharge hydrogen gas having a pressure of about 20 MPa to about 35 MPa.

The fuel cell 100 of the fuel cell system of the second embodiment is identical in construction with the fuel cell 100 of the first embodiment, and therefore no explanation of the fuel cell 100 will be provided.

As shown in FIG. 4, the fuel cell system of the present embodiment includes a hydrogen gas passage, an oxygen gas passage and the controller 50. Since the oxygen gas passage is identical with the oxygen passage of the fuel cell system according to the first embodiment, no redundant description about the oxygen gas passage will be provided.

The hydrogen-gas flow system of the fuel cell system of the second embodiment includes a main-stream passage 401 that extends from an outlet of the high-pressure hydrogen-gas tank 300 to the inlet of the fuel cell 100, a circulation passage 403 through which hydrogen gas returns from the outlet of the fuel cell 100 to the main-stream passage 401 via a pump 410, a drain passage 407 for discharging impurities contained in the circulating hydrogen gas, and a relief passage 409 for discharging the hydrogen gas when the pressure of the hydrogen gas in the fuel cell system is excessively high. In this embodiment in which the high-pressure hydrogen-gas tank 300 is used as the hydrogen-gas supply, a high-pressure hydrogen gas may be released from the tank 300 irrespective of the operating temperature thereof. Thus, no bypass passage 405 as provided in the first embodiment is provided in the fuel cell system of the second embodiment, since there is no need to draw hydrogen gas upon a low-temperature start of the system as in the case of the hydrogen-gas absorbing alloy tank 200.

As shown in FIG. 4, a shut-off valve 302 is disposed at the outlet of the high-pressure hydrogen-gas tank 300, and a pressure reducing valve 418, a heat exchanger 420, a pressure reducing valve 422, and a gas-liquid separator 424 are disposed at selected positions in the main-stream passage 401. Also, a shut-off valve 102 is disposed at the inlet of the fuel cell 100. In addition, a shut-off valve 104 is disposed at the outlet of the fuel cell 100, and a gas-liquid separator 406, a pump 410, and a check valve 426 are disposed at selected positions in the circulation passage 403. Like the first embodiment, a shut-off valve 414 is disposed in the drain passage 407, and a relief valve 416 is disposed in the relief passage 409.

The controller 50 receives a signal (representing the pressure of hydrogen gas in the main-stream passage 401) from a pressure sensor 400, and controls the operation of each of the valves 102, 104, 302, 414, pump 410, and a compressor 504 disposed in an oxygen-gas supply passage 501. FIG. 4 does not show control lines, or the like, which indicate connection between the controller 50 and respective components of the fuel cell system.

Initially, flow of hydrogen gas will be described in detail. Since flow of the oxidizing gas is identical with that in the first embodiment, no explanation on the flow of the oxidizing gas will be provided.

Under control of the controller 50, the shut-off valve 302 for the high-pressure hydrogen-gas tank 300, and the shut-off valves 102, 104 for the fuel cell 100 are basically opened during operations of the fuel cell system, and are closed when the fuel cell system is stopped.

When the fuel cell system is in a normal operating condition, the shut-off valve 414 of the drain passage 407 is closed while the shut-off valves 302, 102, 104 are opened. As in the case of the first embodiment, the relieve valve 416 is normally held in the closed position except when the pressure of the hydrogen gas become excessively high.

During a normal operation of the fuel cell system, the controller 50 keeps the shut-off valve 302 in the open position as described above, so that the hydrogen gas is discharged from the high-pressure hydrogen-gas tank 300. The discharged hydrogen gas is supplied to the fuel cell 100 through the main-stream passage 401. The hydrogen gas thus fed to the fuel cell 100 is subjected to the above-indicated electrochemical reaction in the fuel cell 100, and the resulting hydrogen off-gas is then discharged from the fuel cell 100. The discharged hydrogen off-gas is returned to the main-stream passage 401 through the circulation passage 403, to be supplied again to the fuel cell 100. Like the first embodiment, the pump 410 disposed in the circulation passage 403 is driven or actuated to forcedly feed the hydrogen off-gas into the main-stream passage 401. Namely, the hydrogen gas circulates through the main-stream passage 401 and the circulation passage 403 when the fuel cell system is in the normal operating condition. A check valve 426 for preventing reverse flow of the circulating hydrogen gas is disposed in a portion of the circulation passage 403 located between the pump 410 and a joint of the circulation passage 403 and the main-stream passage 401.

The hydrogen gas discharged from the high-pressure hydrogen-gas tank 300 has a pressure ranging from about 20 MPa to about 35 MPa, as described above. This pressure level is far higher than that of the hydrogen gas discharged from the hydrogen-gas absorbing alloy tank 200 in the first embodiment. Accordingly, if the discharged hydrogen gas is directly fed to the fuel cell 100, the fuel cell 100 will be damaged due to the high pressure of the hydrogen gas. In the second embodiment, therefore, two pressure reducing valves, namely, a first pressure reducing valve 418 and a second pressure reducing valve 422, are disposed at selected positions in the main-stream passage 401. Namely, in the present embodiment, the pressure of the high-pressure hydrogen gas is reduced in two steps at the two pressure reducing valves 418, 422, while the hydrogen gas pressure is reduced only once in the first embodiment. More specifically, the first pressure reducing valve 418 reduces the pressure of the discharged hydrogen gas from a level ranging from about 20 MPa to about 35 MPa to a level ranging from about 0.8 MPa to about 1 MPa. Then the second pressure reducing valve 422 reduces the pressure of the discharged hydrogen gas from a level ranging from about 0.8 MPa to about 1 MPa to a level ranging from about 0.2 MPa to about 0.3 MPa.

When the pressure of the high-pressure hydrogen gas is reduced by the first pressure reducing valve 418 from the level of about 20 MPa to about 35 MPa to the level of about 0.8 MPa to about 1 MPa, the hydrogen gas is rapidly expanded (i.e., the volume of the hydrogen gas is rapidly increased) about 50 times, and the temperature of the hydrogen gas is rapidly reduced. If the hydrogen gas having the reduced temperature is directly supplied to the fuel cell 100, the temperature within the fuel cell 100 is also reduced, resulting in insufficient catalytic activities. In this condition, the electrochemical reaction does not effectively proceed in the fuel cell 100, resulting in deterioration of the power generating operation of the fuel cell 100. In view of this problem, a heat exchanger 420 is disposed between the first and second pressure reducing valves 418, 422. The heat exchanger 420 functions to heat hydrogen gas whose temperature has been rapidly reduced due to its expansion, thereby to supply the hydrogen gas having a sufficiently high temperature to the fuel cell 100. The heat exchanger 420 is supplied with cooling water heated by the fuel cell 100, which is not illustrated in FIG. 4, so that heat exchange between the warmed cooling water and the cooled hydrogen gas takes place in the heat exchanger 420. In this manner, the hydrogen gas whose temperature has been lowered passes through the heat exchanger 420, so that the hydrogen gas can be supplied to the fuel cell 100 with its temperature being raised to a sufficiently high level. Consequently, the temperature in the fuel cell 100 is increased to a level high enough to promote the above-indicated electrochemical reaction, thus permitting an appropriate power generating operation of the fuel cell system.

As is understood from the aforementioned description, the hydrogen gas flowing through the main-stream passage 401 has a relatively low temperature. If the hydrogen gas having the relatively low temperature is mixed with the hydrogen off-gas returned to the main-stream passage 401 through the circulation passage 403, the moisture contained in the hydrogen off-gas is likely to be concentrated, resulting in a possibility that the hydrogen gas in the form of a gas-liquid mixture is supplied to the fuel cell 100. To avoid this possibility, the present embodiment is provided with a gas-liquid separator 424 that is disposed in a portion of the main-stream passage 401 located between the inlet of the fuel cell 100 and the joint of the main-stream passage 401 and the circulation passage 403. The gas-liquid separator 424 functions to separate the moisture contained in the mixed hydrogen gas into a liquid component and a gas component (i.e., water vapor). The gas-liquid separator 424 removes the liquid component of the moisture, and supplies only the gas-component (e.g., water vapor) to the fuel cell 100 together with other gas components in the hydrogen gas. With this arrangement, there is no possibility of a failure or problem in the power generating operation of the fuel cell 100 due to the liquid component of the moisture contained in the hydrogen gas.

While the flow of the hydrogen gas during the normal operation condition of the fuel cell system has been described above, there will be described flow of hydrogen gas during a startup operating condition of the fuel cell system.

When the operation of the fuel cell system is stopped, impurities, such as nitrogen, permeate from the oxygen electrode side to the hydrogen electrode side through the electrolyte layer within the fuel cell 100, and diffuse at the hydrogen electrode side of the fuel cell 100. Consequently, the impurities, such as nitrogen, are contained not only in the oxidizing-gas channels but also the hydrogen-gas channels in the fuel cell 100. Upon a start of the operation of the fuel cell system, therefore, it is necessary to enable the fuel cell 100 to perform an appropriate power generating operation within a short period of time, by removing the impurities from the hydrogen-gas channels and filling these channels with hydrogen gas.

The impurities existing in the hydrogen-gas channels may be removed upon a start of the fuel cell system by, for example, causing a purge gas, such as an inert gas, to flow into the hydrogen-gas channels, thereby to push the impurities out of the channels. However, this method of removing the impurities requires installation of an inert-gas tank on the vehicle for supplying the purge gas, which results in undesirable increases in the required space and weight of the fuel cell system.

In the light of the above-described problem, it may also be considered to directly introduce hydrogen gas into the hydrogen-gas channels so as to push the impurities out of the channels. With this method, however, it takes a long time by the time when the hydrogen gas pushes the impurities out of the hydrogen-gas channels, and the output voltage of the fuel cell reaches a desired level. If the hydrogen gas discharged from the fuel cell is discarded or released to the atmosphere for removal of the impurities for such a long time, the gas released to the atmosphere may contain a high concentration of hydrogen, which may cause an environmental problem.

In view of the above-described situation, upon a start of the fuel cell system of the present embodiment, the hydrogen gas is introduced into the hydrogen-gas channels as described above, and the pump 410 for circulating hydrogen gas is driven or actuated to cause forced flow of the hydrogen gas in the hydrogen-gas flow system. Thus, the impurities present in the hydrogen-gas channels in the fuel cell 100 are uniformly mixed with the hydrogen gas flowing into the channels.

Figure 5:
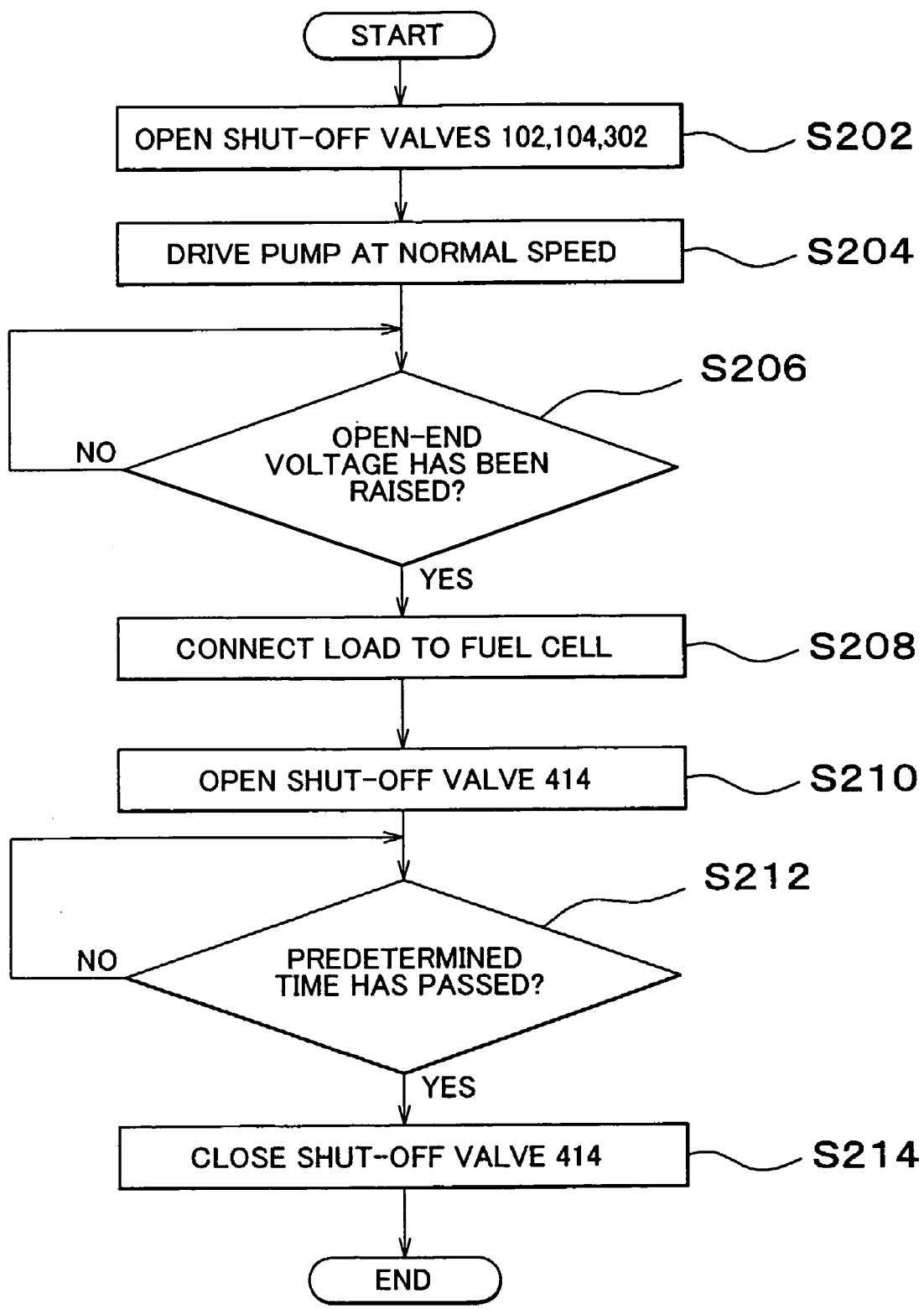
FIG. 5 is a flowchart illustrating an example of a control routine executed by a controller when the fuel cell system of FIG. 4 is started.

FIG. 5 shows a flowchart illustrating an example of a control routine executed by the controller 50 when the fuel cell system of the present embodiment is started.

Upon a start of the fuel cell system, the controller 50 executes step S202 as shown in FIG. 5 to open the shut-off valve 302 of the high-pressure hydrogen-gas tank 300 and the shut-off valves 102 and 104 of the fuel cell system 100, which valves 302, 102, 104 has been closed. In this condition, hydrogen gas is discharged from the high-pressure hydrogen-gas tank 300. The discharged hydrogen gas is then fed to the main-stream passage 401. Next, the controller 50 executes step S204 to operate the pump 410 at its normal speed, to thereby cause forced flow of the hydrogen gas through the circulation passage 403. This forced flow of the hydrogen gas serves to move the impurities existing in the hydrogen-gas channels of the fuel cell 100, and to circulate the impurities and the hydrogen gas so as to homogeneously mix them together within a short period of time.

For instance, if the impurities existing in the hydrogen-gas channels have an atmospheric pressure (0.1 MPa), the hydrogen gas, whose pressure has been reduced to 2 atm (0.2 Mpa), is caused to flow through the hydrogen-gas channels. With the pressures thus controlled, the resulting gas discharged from the fuel cell 100 contains about 50% of impurities and about 50% of hydrogen gas. The thus discharged gas is circulated through the hydrogen-gas flow system while being stirred, so that the impurities are uniformly dispersed in the hydrogen gas.

With the impurities and the hydrogen gas thus homogenized in the manner as described above, an equal amount of hydrogen is supplied to each of the hydrogen electrodes in the fuel cell 100, whereby an open-end voltage of the fuel cell 100 can be immediately raised to a predetermined level. Then, the controller 50 proceeds to step S206 to detect the rise of the open-end voltage of the fuel cell 100, based on an output signal received from a voltage sensor (not shown). If the controller 50 detects the rise of the open-end voltage, it is determined that the fuel cell 100 is ready to generate power, and a load (not shown) is connected to the fuel cell 100 in step S208. The controller 50 then proceeds to step S210 to open the shut-off valve 414, to thereby gradually discharge the circulating hydrogen gas (i.e., the homogeneous mixture of the impurities and the hydrogen gas). Since the hydrogen gas is continuously supplied from the high-pressure hydrogen-gas tank 300 to the main-stream passage 401, the hydrogen concentration of the circulating hydrogen gas gradually increases.

If the controller 50 determines in step S212 that a predetermined time has passed after opening of the shut-off valve 414, the shut-off valve 414 is closed in step S214, assuming that the impurities existing in the hydrogen-gas channels have been removed to some extent, and the hydrogen concentration of the circulating hydrogen gas has increased to a sufficiently high level. Then, the fuel cell system is placed in the normal operating condition.

Upon a start of the fuel cell system of the present embodiment, the hydrogen gas is introduced into the hydrogen-gas channels of the fuel cell 100, and the pump 410 is driven so as to forcedly circulate the hydrogen gas, as described above, thus making it possible to increase the output voltage of the fuel cell to the desired level within a short period of time. Further, the fuel cell system of this embodiment does not require purge gas, thereby eliminating the need for a gas tank for supplying the purge gas, resulting in reductions in the required space and weight of the fuel cell system. Furthermore, the fuel cell system of the present embodiment does not emit hydrogen gas having a high concentration of hydrogen, thus assuring a high degree of safety.

The shut-off valve 414 disposed in the drain passage 407 and the relief valve 416 disposed in the relief passage 409 are identical with those in the first embodiment, and no explanation of these valves will be provided herein.

Modified Examples

It is to be understood that the invention is not limited to the details of the illustrated embodiments, but may be otherwise embodied with various changes, modifications or improvements, without departing from the scope of the invention.

In the illustrated first and second embodiments, the gas-liquid separator 406 is disposed in the circulation passage 403. This arrangement may be applied to a fuel cell system that employs, as a hydrogen gas supply, a reformer for reforming a raw fuel so as to produce hydrogen gas, instead of the hydrogen-gas absorbing alloy tank 200 or the high-pressure hydrogen-gas tank 300.

In fuel cell system of the second embodiment, the gas-liquid separator 424 is disposed in the main-stream passage 401. This arrangement is equally applicable to the fuel cell system of the first embodiment, and to the fuel cell system that includes the reformer as the hydrogen gas supply.

In the fuel cell system of the second embodiment, the heat exchanger 420 is disposed between the pressure reducing valves 418 and 422. The heat exchanger 420 may be disposed downstream of the pressure reducing valve 422. Since the fuel cell system of the first embodiment uses the pressure reducing valve 404, a suitable heat exchanger may be disposed downstream of the pressure reducing valve 404 as needed.

In the fuel cell system of the second embodiment, the operation of the fuel cell system is controlled according to the control routine as shown in FIG. 5 when the fuel cell system is started. The same control routine may be used for controlling the fuel cell system of the first embodiment, and the fuel cell system in which the reformer is used as the hydrogen gas supply. In the case where the control according to the routine of FIG. 5 is performed on the fuel cell system of the first embodiment while the system is in a low-temperature startup condition, the pump 410 is initially driven to draw the hydrogen gas from the hydrogen-gas absorbing alloy tank 200. Subsequently, the open/closed positions of the shut-off valves 402, 408, 412 are switched or changed, and the pump 410 is operated to circulate the impurities remaining in the hydrogen-gas channels together with the hydrogen gas drawn from the tank 200, so that the impurities are homogeneously dispersed or distributed in the hydrogen gas.

What is claimed is:

1. An on-board fuel cell system adapted to be installed on a motor vehicle, comprising:
   a hydrogen-gas storage device including a hydrogen-gas absorbing alloy capable of absorbing or releasing a hydrogen gas;
   a fuel cell that is supplied with the hydrogen gas discharged from the hydrogen-gas storage device, so as to generate electric power, while discharging a remaining portion of the hydrogen gas;
   a first passage that connects an outlet of the hydrogen-gas storage device with an inlet of the fuel cell, and allows the hydrogen gas discharged from the hydrogen-gas storage device to flow therethrough to be supplied to the fuel cell;
   a second passage that connects an outlet of the fuel cell with a first point in the first passage, and allows the hydrogen gas discharged from the fuel cell to flow therethrough to be returned to the first passage;
   a pump that is disposed in the second passage, and is operable to force the hydrogen gas in the second passage to flow toward the first point in the first passage;
   a third passage that connects a second point located in the first passage between an outlet of the hydrogen-gas storage device and the first point, with a third point located in the second passage between the outlet of the fuel cell and the pump, the third passage allowing the hydrogen gas diverting from the first passage to flow therethrough to be fed to the second passage;
   a first valve that is disposed in the first passage between the second point and the first point, and is able to permit and inhibit flow of gas therethrough upon opening and closing thereof, respectively;
   a second valve that is disposed in the second passage between the outlet of the fuel cell and the third point, and is able to permit and inhibit flow of gas therethrough upon opening and closing thereof, respectively;
   a third valve that is disposed in the third passage, and is able to permit and inhibit flow of gas therethrough upon opening and closing thereof, respectively; and
   a controller that controls the pump and the first, second and third valves, wherein:
   when a pressure of the hydrogen gas discharged from the hydrogen-gas storage device is higher than a reference pressure, the controller opens the first and second valves and closes the third valve, so that the hydrogen gas discharged from the hydrogen-gas storage device is supplied to the fuel cell through the first passage, and the hydrogen gas discharged from the fuel cell is returned to the first passage through the second passage, with the pump circulating the hydrogen gas; and
   when the pressure of the hydrogen gas discharged from the hydrogen-gas storage device is lower than the reference pressure, the controller closes the first and second valves and opens the third valve, and causes the pump to draw the hydrogen gas out of the hydrogen-gas storage device and feed the hydrogen gas from the first passage to the second passage through the third passage, so that the hydrogen gas is supplied from the second passage to the fuel cell through the first passage.

2. The on-board fuel cell system according to claim 1, wherein at least one of the first and second valves includes a reverse-flow preventing device that inhibits the hydrogen gas from flowing from the fuel cell toward the hydrogen-gas storage device.

3. The on-board fuel cell system according to claim 1, wherein the pump is driven at a first speed for circulating the hydrogen gas, and is driven at a second speed higher than the first speed for drawing the hydrogen gas out of the hydrogen-gas storage device.

4. The on-board fuel cell system according to claim 1, further comprising a pressure reducing device that is disposed between the outlet of the hydrogen-gas storage device and the first point in the first passage, and is operable to reduce a pressure of the hydrogen gas discharged from the hydrogen-gas storage device.

5. The on-board fuel cell system according to claim 4, further comprising:
   a fourth passage that extends from a particular point in the first passage between the pressure reducing device and the inlet of the fuel cell, toward an outside of the vehicle; and
   a relief valve that is disposed in the fourth passage, and is able to permit and inhibit flow of gas therethrough upon opening and closing thereof, respectively, wherein when a pressure of the hydrogen gas in a portion of the first passage between the pressure reducing device and the fuel cell is higher than a reference pressure, the relief valve is opened so that the hydrogen gas is discharged from the first passage to the outside of the vehicle through the fourth passage.

6. The on-board fuel cell system according to claim 1, further comprising a gas-liquid separator that is disposed in at least one of the first and second passages, and is operable to separate a moisture contained in the hydrogen gas discharged from the fuel cell into a liquid component and a gaseous component, and remove only the liquid component.

7. An on-board fuel cell system adapted to be installed on a motor vehicle, comprising:
   a hydrogen-gas supply device that supplies a hydrogen gas;
   a fuel cell that is supplied with the hydrogen gas discharged from the hydrogen-gas supply device, so as to generate electric power, while discharging a remaining portion of the hydrogen gas, the fuel cell having a plurality of channels through which the hydrogen gas flows;

a first passage that connects an outlet of the hydrogen-gas supply device with an inlet of the fuel cell, and allows the hydrogen gas discharged from the hydrogen-gas supply device to flow therethrough to be supplied to the fuel cell;

a second passage that connects an outlet of the fuel cell with a particular point in the first passage, and allows the hydrogen gas discharged from the fuel cell to flow therethrough to be returned to the first passage;

a first valve that is disposed in the first passage between the outlet of the hydrogen-gas supply device and the particular point, and is able to permit and inhibit flow of gas therethrough upon opening and closing thereof, respectively;

a pump that is disposed in the second passage, and is operable to force the hydrogen gas in the second passage to flow toward the particular point in the first passage;

a second valve that is disposed in the second passage between the outlet of the fuel cell and the pump, and is able to permit and inhibit flow of gas therethrough upon opening and closing thereof, respectively;

a bypass passage that connects the outlet of the hydrogen-gas supply device with the second passage upstream of the pump;

a bypass valve that is disposed in the bypass passage, and is able to permit and inhibit flow of gas therethrough upon opening and closing thereof, respectively; and a controller comprising control means for controlling flow in the first and second passages according to a first start operation of the fuel cell system before connecting said fuel cell to a load such that, upon the start of the fuel cell system according to the first start operation, the outlet of the fuel cell is in communication with the second passage and the hydrogen-gas supply device delivers the hydrogen gas, while the pump is driven to thereby mix gases exiting from the outlet of the fuel cell with the hydrogen gas delivered from the hydrogen-gas supply device to provide a homogeneous mixture thereof to the inlet of the fuel cell; and wherein the control means further controls flow in the first and second passages according to a second start operation, and wherein according to said second start operation the first valve and the second valve are closed and the bypass valve is opened so that the hydrogen-gas supply device delivers hydrogen to the inlet of the fuel cell through the pump provided in the second passage, and wherein the control means selectively operates according to the first start operation or the second start operation based upon at least one operating condition of said system.

8. The on-board fuel cell system according to claim 7, further comprising a gas-liquid separator that is disposed in at least one of the first and second passages, and is operable to separate a moisture contained in the hydrogen gas discharged from the fuel cell into a liquid component and a gaseous component, and remove only the liquid component.

9. The on-board fuel cell system according to claim 7, further comprising at least one pressure reducing device that is disposed between the outlet of the hydrogen-gas storage device and the particular point in the first passage, and is operable to reduce a pressure of the hydrogen gas discharged from the hydrogen-gas supply device.

10. The on-board fuel cell system according to claim 9, further comprising:

a third passage that extends from a particular point in the first passage between the at least one pressure reducing device and the inlet of the fuel cell, toward an outside of the vehicle; and a relief valve that is disposed in the third passage, and is able to permit and inhibit flow of gas therethrough upon opening and closing thereof, respectively, wherein when a pressure of the hydrogen gas in a portion of the first passage between the pressure reducing device and the fuel cell is higher than a reference pressure, the relief valve is opened so that the hydrogen gas is discharged from the first passage to the outside of the vehicle through the third passage.

11. The on-board fuel cell system according to claim 9, further comprising a temperature raising device that is disposed in the first passage between one of the at least one pressure reducing device and the inlet of the fuel cell, and is operable to raise a temperature of the hydrogen gas flowing through the first passage.

12. The on-board fuel cell system according to claim 7, further comprising a drain passage connecting said second passage to an outside of the vehicle, and a shut-off valve positioned for shutting said drain passage, wherein said control means shuts said shut-off valve such that the shut-off valve is in a state of being shut at a time that the pump disposed in the second passage is driven.

13. The on-board fuel cell system according to claim 7, wherein during operation according to said first start operation hydrogen is fed from said hydrogen-gas supply device to a location downstream of said pump.

14. The on-board fuel cell system according to claim 13, wherein the at least one operating condition includes a detected pressure of hydrogen gas exiting hydrogen-gas supply device and the first start operation or the second start operation is selected based on a comparison of a detected pressure of hydrogen gas exiting the hydrogen-gas supply device with a predetermined reference pressure, and wherein the first start operation is selected when the detected pressure exceeds the predetermined reference pressure.

15. The on-board fuel cell system according to claim 8, wherein the at least one operating condition includes a detected pressure of hydrogen gas exiting the hydrogen-gas supply device and the first start operation or the second start operation is selected based on a comparison of a detected pressure of hydrogen gas exiting the hydrogen-gas supply device with a predetermined reference pressure, and wherein the first start operation is selected when the detected pressure exceeds the predetermined reference pressure.

16. The on-board fuel cell system according to claim 7, wherein the controller alternatively controls flow of hydrogen from the hydrogen-gas supply to: (a) flow from the hydrogen-gas supply to a location downstream of the pump without flowing through the bypass and without flowing through the pump, or (b) flow through the bypass to a location upstream of the pump such that the hydrogen passes from the hydrogen-gas supply and through the pump before entering the fuel cell.

17. The on-board fuel cell according to claim 7, wherein a first pressure reducing valve is provided along the first passage, and a heat exchanger is provided along the first passage downstream from the first pressure reducing valve.

18. The on-board fuel cell according to claim 17, wherein a second pressure reducing valve is provided along the first passage, and wherein the heat exchanger is provided between the first and second pressure reducing valves.

19. The on-board fuel cell according to claim 17, wherein the heat exchanger is upstream of the particular point at which the second passage connects with the first passage.

20. The on-board fuel cell system according to claim 7, wherein in the first start operation the gases exiting from the outlet of the fuel cell are impurities.

* * * * *